Oct. 16, 1923.
D. McQ. BLISS
1,470,801
COMBINED BUSHING RETAINING SCREW AND LUBRICATOR
Filed May 9, 1921
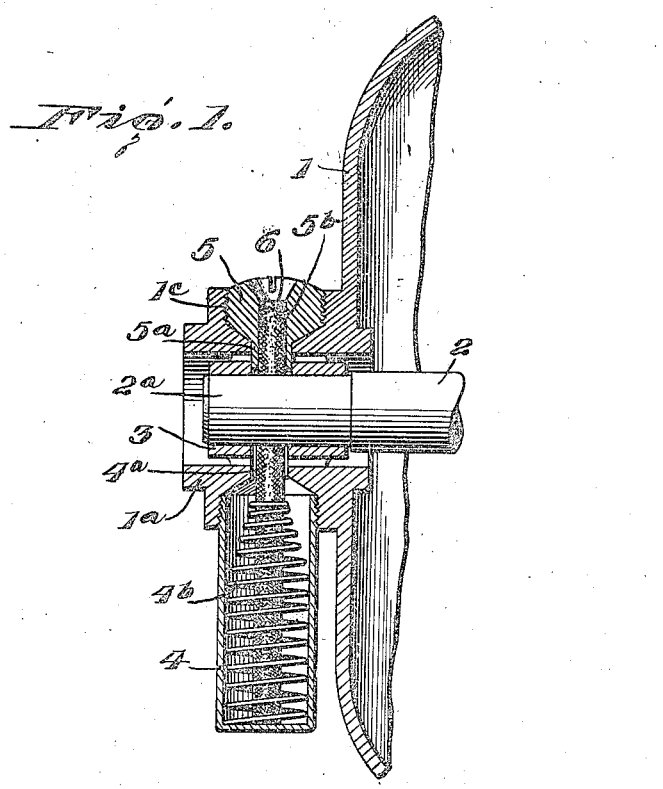
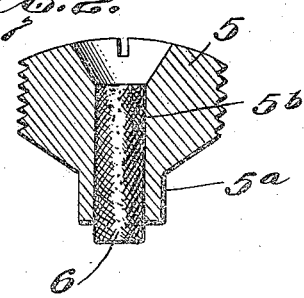
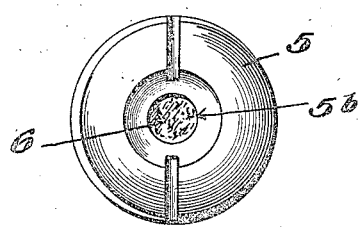
Inventor
Donald M. Bliss
By Alexander Powell
Attorneys
Witness:
Robert F. Beck Patented Oct. 16, 1923.

1,470,801

UNITED STATES PATENT OFFICE.

DONALD McQUEEN BLISS, OF BATTLE CREEK, MICHIGAN, ASSIGNOR TO H. B. SHERMAN MANUFACTURING CO., OF BATTLE CREEK, MICHIGAN, A CORPORATION OF MICHIGAN.

COMBINED BUSHING-RETAINING SCREW AND LUBRICATOR.

Application filed May 9, 1921. Serial No. 467,849.

*To all whom it may concern:*

Be it known that I, DONALD M. BLISS, a citizen of the United States, residing at Battle Creek, in the county of Calhoun and State of Michigan, have invented certain new and useful Improvements in Combined Bushing Retaining Screws and Lubricators; and I hereby declare that the following is a full, clear, and exact description thereof, reference being had to the accompanying drawings, which form part of this specification.

This invention relates to means for retaining in place the bushings for the journals of rotating shafts, and is particularly adapted for use in electrical motors and like apparatus.

The object of the invention is to provide an efficient, screw retainer which will also serve as a simple lubricating device, principally intended to be used as an auxiliary to the means of lubrication commonly provided, to prevent the bearing from becoming overheated through failure of the usual means of lubrication, or for any other reason.

The invention is very simple and can be readily applied to a great variety of journal bearing retaining screws. In the drawings I have illustrated the invention as applied to a shaft journal bearing such as is commonly used in electric motors, and will explain the invention with reference to such drawings; it being understood that the invention is capable of use in connection with many other forms of journal bearings.

In the accompanying drawings:

Fig. 1 represents a vertical sectional view of an ordinary journal bearing of the shaft of an electric motor, having the usual lubricating means; and having one of my novel combined bushing retainer and auxiliary safety lubricating devices applied thereto.

Fig. 2 is an enlarged sectional view of such retainer detached.

Fig. 3 is a top plan view of Fig. 2.

In said drawings the shaft 2 of the motor (not shown) has a journal $2^a$ mounted in the usual sleeve or bushing 3 within a bearing $1^a$ on the frame 1 of the motor. In the example shown the cup 4 of an ordinary lubricating device is detachably attached to the underside of the bearing $1^a$. This cup is filled with lubricant in the usual manner and contains a wick $4^a$ upheld by a spring $4^b$ and the upper end of this wick projects out of the cup and extends through apertures in the underside of the bearing $1^a$ and the bushing 3 and supplies lubricant from the cup 4 to the journal $2^a$ of the shaft 2. The form of bearing and lubricating device thus far shown is well known and needs no further particular description herein. Any other sort of bearing and lubricating devices may be employed as my invention is more particularly designed for use as an auxiliary or safety lubricating means, and to come into effective operation in case of failure of the main or usual lubricating devices.

In the form of bearing shown in Fig. 1 it has heretofore been customary to provide a threaded opening $1^c$ in the upper side of the bearing $1^a$ in which opening is fitted a bushing retaining screw 5 which screw ordinarily has a reduced shank $5^a$ which passes through the lower contracted portion of the opening $1^c$ and engages a hole in the top of the bushing as shown, so as to hold the bushing in position in the bearing against both rotary and longitudinal movement.

In the present invention I convert such retaining screw 5 into an auxiliary lubricating device. To do this an axial bore $5^b$ is made through the body and extension $5^a$ of the screw; and in this bore I insert a core 6, which may be made of any suitable lubricating material or compound, or a material which will absorb lubricant. The core 6 may be of wicking or like material saturated with oil. When the invention is to be used as a safety lubricator in emergencies, I propose to make the core of a lubricating composition or material which will normally remain hard but will melt if the temperature of the bearing rises beyond a certain limit and then supply lubricant to the journal $2^a$.

The lower end of the core 6 normally contacts with the journal $2^a$ and will aid in lubrication as stated. Normally so long as the usual lubricating devices are effectively operating there will be no demand upon my auxiliary lubricating device, but if the usual lubricating means should fail or become exhausted then my auxiliary lubricating device would become effective and lubricate the shaft.

The auxiliary device is also useful as it will lubricate the journal if it becomes necessary to remove the usual or main lubricating devices for repairs, or other purposes.

I do not consider my simple auxiliary lubricating device limited to the particular form of screw shown, nor to use in connection with the particular combination of parts, or construction of major lubricating devices, shown in the drawings.

What I claim is:

1. In combination, a bearing, a bushing in the bearing, a shaft journaled in the bushing and means for lubricating the journal; with a hollow screw tapped through the bearing and having its inner end reduced and entered within the bushing, said screw having an axial bore extending through the reduced portion and a lubricating means filling the bore.

2. A bearing bushing retainer comprising a screw having a reduced end adapted to enter an opening in the bushing and provided with a lubricating duct extending axially of the screw and through the reduced end thereof, and a lubricating member in said duct adapted to feed lubricant to the journal in the bushing when the retainer is in place.

In testimony that I claim the foregoing as my own, I affix my signature.

DONALD McQUEEN BLISS.